(No Model.) 2 Sheets—Sheet 1.

J. D. PHYFE & J. J. HAROLD.
SAFETY ATTACHMENT FOR ELEVATORS.

No. 307,985. Patented Nov. 11, 1884.

WITNESSES:
Gustave Dieterich
C. Sedgwick

INVENTOR:
J. D. Phyfe
J. J. Harold
BY Munn & Co
ATTORNEYS.

N. PETERS. Photo-Lithographer, Washington, D. C.

(No Model.) 2 Sheets—Sheet 2.
J. D. PHYFE & J. J. HAROLD.
SAFETY ATTACHMENT FOR ELEVATORS.

No. 307,985. Patented Nov. 11, 1884.

WITNESSES:
Gustave Dieterich
C. Sedgwick

INVENTOR:
J. D. Phyfe
J. J. Harold
BY Munn & Co.
ATTORNEYS.

UNITED STATES PATENT OFFICE.

JOHN D. PHYFE, OF DEMAREST, AND JAMES J. HAROLD, OF TENAFLY, NEW JERSEY.

SAFETY ATTACHMENT FOR ELEVATORS.

SPECIFICATION forming part of Letters Patent No. 307,985, dated November 11, 1884.

Application filed April 7, 1884. (No model.)

*To all whom it may concern:*

Be it known that we, JOHN D. PHYFE, of Demarest, in the county of Bergen and State of New Jersey, and JAMES J. HAROLD, of Tenafly, in the county of Bergen and State of New Jersey, have invented a new and Improved Safety Attachment for Elevators, of which the following is a full, clear, and exact description.

This invention consists of the application to elevators of revolving wheels or cylinders provided with studs arranged to come in contact with suitable fixed detents, in case the elevator-rope should break, furnishing a positive lock to the falling of the elevator-cage.

Reference is to be had to the accompanying drawings, forming a part of this specification, in which similar letters of reference indicate corresponding parts in all the figures.

Figure 1:
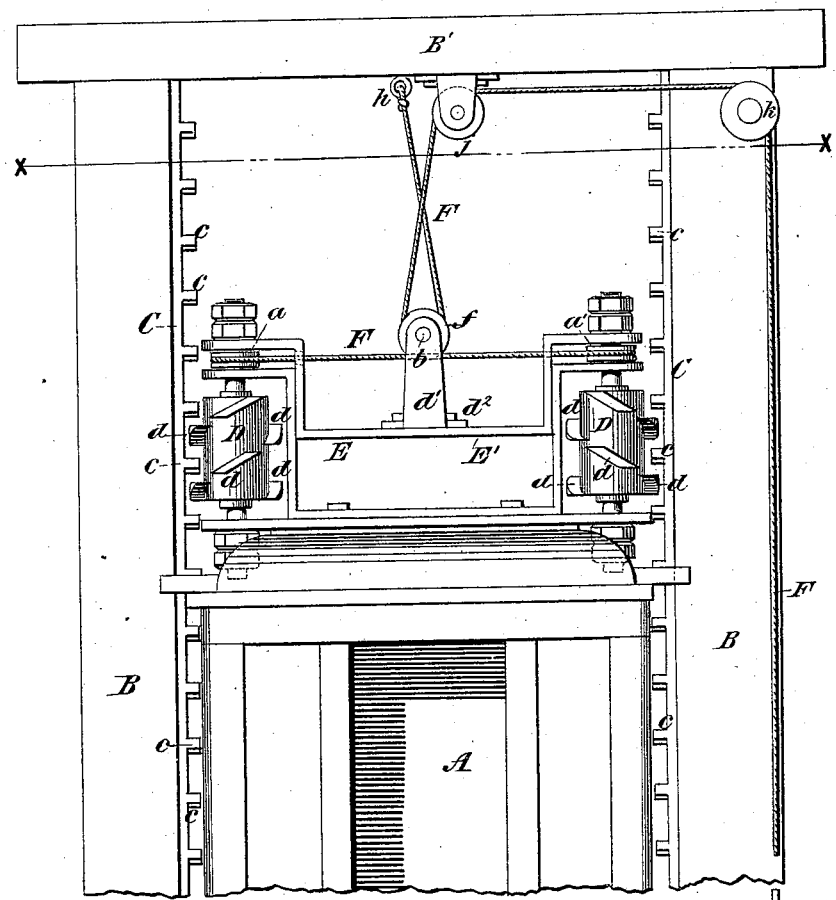
Figure 2:
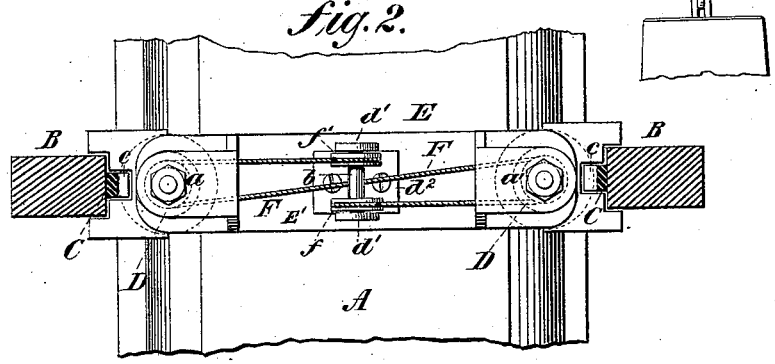
Figure 3:
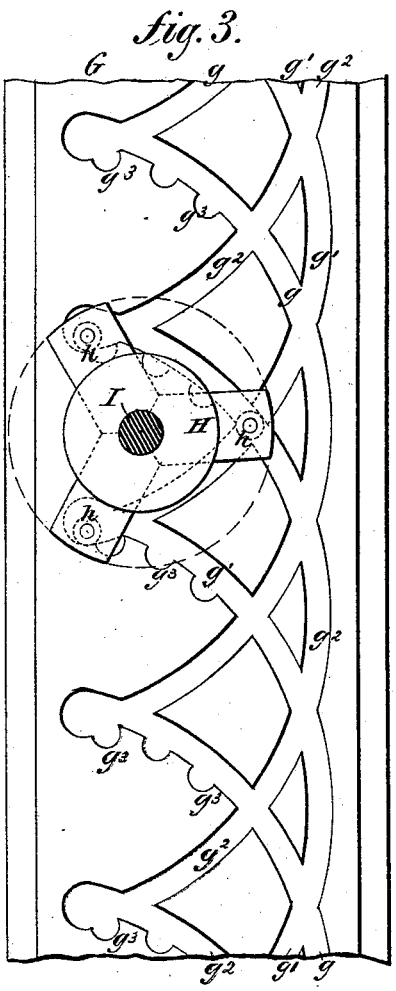
Figure 4:
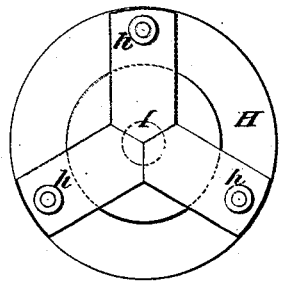

Figure 1 is a front elevation showing one method of carrying our invention into effect. Fig. 2 is a sectional plan view of the same, taken on the line $x\ x$ of Fig. 1, and Figs. 3 and 4 show another method of carrying our invention into effect.

A represents an elevator-cage, and B B represent side posts fitted in the elevator-well.

Secured to the inner edges of the posts B B are metal plates C C, which have the series of detents or studs $c\ c$ formed upon or secured to their inner surfaces. D D are two cylinders journaled in vertical position in the frame E, secured to the top of the cage A. These cylinders D are each formed or provided with the series of spirally-arranged studs or projections $d$, and the shafts or gudgeons of the cylinders D are provided with the fixed pulleys $a\ a'$, around which the elevator-rope F passes, so that the cylinders D will be revolved by the rope while the cage A is being raised and lowered in the well.

$f\ f'$ are the pulleys by which the cage A is raised and lowered. These are journaled upon the same shaft $b$, which is held at its ends in the side pieces, $d'\ d'$, which form a part of the plate $d^2$, which is bolted to the center of the upper plate, E', of the frame E, as shown clearly in Figs. 1 and 2. The elevator-rope F is attached at its upper end to the eyebolt $h$, secured in the cross-piece B' at the top of the elevator-well. From this eyebolt $h$ the elevator-rope passes down over the pulley $f'$, thence around the pulley $a$, thence across to and around the pulley $a'$, thence under the pulley $f$, and thence over the pulleys $j\ k$ down to the power-drum, (not shown,) to which it is attached in the ordinary manner. With this arrangement, when the elevator-rope F is wound upon or unwound from the power-drum for raising or lowering the elevator-cage A, the cylinders D D will be revolved by the rope F passing around the pulleys $a\ a'$, which revolution will cause the studs $d$ of the cylinders D, owing to their spiral and separated arrangement upon the cylinders, to clear and pass between the studs or detents $c$, so that the said studs and detents will in no manner interfere with the free up-and-down movement of the cage A while all is working right; but should the elevator-rope F break, the cylinders D will cease to revolve and the studs $d$ will no longer clear the detents $c$, but will drop upon them, and thus lock the cage and prevent it from falling.

In place of the metal plates C we may use two plates, G, (shown in Fig. 3,) formed with the curved or scalloped intersecting grooves $g\ g'\ g^2$, which have the pockets or detents $g^3$ formed in them. With these plates we shall employ two revolving wheels, H, each provided with studs $h$, which run in the grooves $g\ g'\ g^2$ as the elevator-cage is raised and lowered, the said wheels H being secured to the ends of the horizontal shaft I, journaled at the top of the elevator-cage and revolved by the elevator-rope passing over a suitable pulley fixed thereon. With this arrangement, as the elevator-cage is raised and lowered and the shaft I and wheels H are revolved, the studs $h$ will describe the curves of the slots $g\ g'\ g^2$, and thus move freely therein, so as not to interfere with the free up-and-down movement of the cage; but if the elevator-rope should break, the shaft I and wheels H will cease to revolve and the studs $h$, one or other of them, will instantly drop into one of the detents $g^3$, which will positively lock the cage in the well and hold it from falling.

Instead of using the pulleys $a\ a'$, over or around which the rope F passes, for revolving the cylinders D, suitable gearing may be employed with a shaft arranged to be revolved by the up-and-down movement of the cage, and not depart from the principle of our invention, and in place of three, one or more studs $h$ might be used upon the wheels H, and a single wheel H or cylinder D might be used in place of one at each side of the cage, if desired.

Having thus described our invention, we claim as new and desire to secure by Letters Patent—

1. The combination, with an elevator-cage, of revolving wheels or cylinders formed or provided with studs arranged to act in connection with detents at the side of the well, for holding the cage from falling in case of breakage of the elevator-rope, substantially as described.

2. The vertically-journaled cylinders D, formed with the spirally-arranged studs $d$, in combination with the detents $c$ at the sides of the well, and the described arrangement of pulleys over which the elevator-rope passes for revolving the cylinders D, substantially as and for the purposes set forth.

JOHN D. PHYFE.
JAMES J. HAROLD,

Witnesses:
H. A. WEST,
C. SEDGWICK.